United States Patent
Durocher et al.

(10) Patent No.: US 12,503,246 B2
(45) Date of Patent: Dec. 23, 2025

(54) ELECTRIC MOTOR PROPULSION SYSTEM FOR AN AIRCRAFT

(71) Applicant: Pratt & Whitney Canada Corp., Longueuil (CA)

(72) Inventors: Eric S. Durocher, Boucherville (CA); Michel Labrecque, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 131 days.

(21) Appl. No.: 18/207,796

(22) Filed: Jun. 9, 2023

(65) Prior Publication Data
US 2024/0409230 A1 Dec. 12, 2024

(51) Int. Cl.
| | | |
|---|---|---|
| *B64D 35/021* | (2024.01) | |
| *F16H 1/28* | (2006.01) | |
| *F16H 37/04* | (2006.01) | |
| *F16H 57/038* | (2012.01) | |
| *F16H 57/02* | (2012.01) | |

(52) U.S. Cl.
CPC .............. *B64D 35/021* (2024.01); *F16H 1/28* (2013.01); *F16H 37/041* (2013.01); *F16H 57/038* (2013.01); *F16H 2001/2872* (2013.01); *F16H 2057/02043* (2013.01)

(58) Field of Classification Search
CPC ...... B64D 35/021; B64D 27/30; B64D 27/34; F16H 1/28
See application file for complete search history.

(56) References Cited

U.S. PATENT DOCUMENTS

| | | | | |
|---|---|---|---|---|
| 7,802,757 | B2 * | 9/2010 | Dooley | F01D 15/10 |
| | | | | 60/788 |
| 10,717,539 | B2 * | 7/2020 | Menheere | H02K 7/1807 |
| 10,752,129 | B2 * | 8/2020 | Julien | F01P 3/20 |
| 11,186,378 | B2 * | 11/2021 | Dubreuil | B64D 27/24 |
| 11,787,551 | B1 * | 10/2023 | Graves | B64D 33/10 |
| | | | | 244/56 |
| 12,071,252 | B1 * | 8/2024 | Durocher | B64C 11/44 |
| 2015/0340927 | A1 | 11/2015 | Maiwald | |
| 2020/0381984 | A1 | 12/2020 | Sercombe | |

(Continued)

FOREIGN PATENT DOCUMENTS

| | | | | |
|---|---|---|---|---|
| EP | 3670965 A1 * | 6/2020 | | B64D 35/02 |
| EP | 3670965 B1 | 4/2021 | | |
| WO | 2022123229 A1 | 6/2022 | | |

OTHER PUBLICATIONS

EP Search Report for EP Patent Application No. 24181124.9 dated Oct. 15, 2024.

*Primary Examiner* — Sherry L Estremsky
(74) *Attorney, Agent, or Firm* — Getz Balich LLC (57) ABSTRACT

An assembly for a propulsion system of an aircraft includes a gearbox, at least one accessory load assembly, a propulsor, and an electric motor. The gearbox module includes a gear assembly and an output shaft. The gear assembly is connected to the output shaft. The at least one accessory load assembly includes at least one accessory load coupled to the output shaft. The propulsor is coupled to the output shaft. The electric motor includes a rotor. The rotor is coupled to the gear assembly to drive rotation of the output shaft about a rotational axis. The rotation of the output shaft drives rotation of the propulsor and the at least one accessory load for each accessory load assembly of the at least one accessory load assembly.

17 Claims, 7 Drawing Sheets

(56) References Cited

U.S. PATENT DOCUMENTS

| | | |
|---|---|---|
| 2020/0400036 A1 | 12/2020 | Redford |
| 2021/0371120 A1 | 12/2021 | Speller |
| 2022/0260019 A1 | 8/2022 | De Wergifosse |
| 2024/0300663 A1* | 9/2024 | Kobayashi ............. H02K 7/003 |
| 2024/0375782 A1* | 11/2024 | Durocher ............... H02K 7/006 |

* cited by examiner

ELECTRIC MOTOR PROPULSION SYSTEM FOR AN AIRCRAFT

TECHNICAL FIELD

This disclosure relates generally to an aircraft propulsion system and, more particularly, to an electric aircraft propulsion system driven by an electric motor.

BACKGROUND OF THE ART

Electric propulsion systems for aircraft may include an electric motor configured to provide thrust for the aircraft. Various electric aircraft propulsion systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a propulsion system of an aircraft includes a gearbox, at least one accessory load assembly, a propulsor, and an electric motor. The gearbox module includes a gear assembly and an output shaft. The gear assembly is connected to the output shaft. The at least one accessory load assembly includes at least one accessory load coupled to the output shaft. The propulsor is coupled to the output shaft. The electric motor includes a rotor. The rotor is coupled to the gear assembly to drive rotation of the output shaft about a rotational axis. The rotation of the output shaft drives rotation of the propulsor and the at least one accessory load for each accessory load assembly of the at least one accessory load assembly.

In any of the aspects or embodiments described above and herein, the gear assembly may be a planetary gear assembly.

In any of the aspects or embodiments described above and herein, the planetary gear assembly may include a sun gear, a plurality of planet gears, and a planet carrier. The sun gear may be coupled to the rotor. Each planet gear of the plurality of planet gears may be engaged with the sun gear and configured to revolve around the sun gear as the sun gear rotates. The planet carrier may be rotatably connected to each planet gear of the plurality of planet gears. The planet carrier may be connected to the output shaft and configured to drive rotation of the output shaft as the plurality of planet gears revolve around the sun gear.

In any of the aspects or embodiments described above and herein, the output shaft may extend between and to a first axial end and a second axial end. The output shaft may be connected to the propulsor at the first axial end. The output shaft may be connected to the gear assembly at the second axial end.

In any of the aspects or embodiments described above and herein, the output shaft may include a bevel gear. The bevel gear may be coupled to the at least one accessory load for each accessory load assembly of the at least one accessory load assembly.

In any of the aspects or embodiments described above and herein, each accessory load assembly may further include a shaft. The shaft may be engaged with the bevel gear and the at least one accessory load.

In any of the aspects or embodiments described above and herein, the at least one accessory load assembly may be positioned radially outside the output shaft.

In any of the aspects or embodiments described above and herein, the at least one accessory load assembly may include a plurality of accessory load assemblies circumferentially distributed about the gearbox module.

In any of the aspects or embodiments described above and herein, the at least one accessory load assembly may include an oil scavenge pump disposed at a vertical bottom of the gearbox module.

In any of the aspects or embodiments described above and herein, the gearbox module may include a gearbox housing surrounding the gear assembly and the output shaft. The oil scavenge pump may be disposed within the gearbox housing.

According to another aspect of the present disclosure, an assembly for a propulsion system of an aircraft includes a gearbox module, at least one accessory load assembly, a propulsor, and an electric motor. The gearbox module includes a planetary gear assembly and an output shaft. The planetary gear assembly includes a sun gear, a plurality of planet gears, and a planet carrier. Each planet gear of the plurality of planet gears is engaged with the sun gear and configured to revolve around the sun gear as the sun gear rotates. The planet carrier is rotatably connected to each planet gear of the plurality of planet gears. The planet carrier is connected to the output shaft and configured to drive rotation of the output shaft as the plurality of planet gears revolve around the sun gear. The at least one accessory load assembly includes at least one accessory load coupled to the output shaft. The propulsor is coupled to the output shaft. The electric motor includes a rotor coupled to the sun gear.

In any of the aspects or embodiments described above and herein, the gearbox module may include a gearbox housing surrounding the gear assembly and the output shaft. The at least one accessory load assembly may include an oil scavenge pump disposed at a vertical bottom of the gearbox housing.

In any of the aspects or embodiments described above and herein, the planetary gear assembly may further include a ring gear fixedly mounted to the gearbox housing. Each planet gear of the plurality of planet gears may be engaged with the ring gear.

In any of the aspects or embodiments described above and herein, the rotor may include a first shaft coupled to the sun gear.

In any of the aspects or embodiments described above and herein, the assembly may further include a mid-frame module. The mid-frame module may include a second shaft and a bearing assembly. The second shaft may extend between and to a first axial end and a second axial end. The second shaft may be connected to the sun gear at the first axial end. The second shaft may be connected to the first shaft at the second axial end. The bearing assembly may rotatably support the second shaft.

In any of the aspects or embodiments described above and herein, the mid-frame module may further include a mid-frame case surrounding the second shaft and the bearing assembly. The mid-frame case may form an oil scavenge cavity. The mid-frame case may be configured to direct oil from the mid-frame module to the gearbox module through the scavenge cavity.

According to another aspect of the present disclosure, an assembly for a propulsion system of an aircraft includes a gearbox module, at least one accessory load assembly, a propulsor, an electric motor, and a mid-frame module. The gearbox module includes a gear assembly and an output shaft. The gear assembly is connected to the output shaft. The at least one accessory load assembly includes at least one accessory load coupled to the output shaft. The propulsor is coupled to the output shaft. The electric motor assembly includes an electric motor. The electric motor includes a rotor. The mid-frame module is mounted to the gearbox module and the electric motor assembly. The mid-frame module includes a shaft and a bearing assembly. The shaft couples the rotor to the gear assembly. The bearing assembly rotatably supports the shaft.

In any of the aspects or embodiments described above and herein, the mid-frame module may be disposed axially between the gearbox module and the electric motor assembly.

In any of the aspects or embodiments described above and herein, the mid-frame module may further include a mid-frame case surrounding the shaft and the bearing assembly. The mid-frame case may form an oil scavenge cavity. The mid-frame case may be configured to direct oil from the mid-frame module to the gearbox module through the scavenge cavity.

In any of the aspects or embodiments described above and herein, the mid-frame module may further include a mid-frame case surrounding the shaft and the bearing assembly. The mid-frame case may form an oil tank vertically below the shaft.

The present disclosure, and all its aspects, embodiments and advantages associated therewith will become more readily apparent in view of the detailed description provided below, including the accompanying drawings.

DETAILED DESCRIPTION

Figure 1:
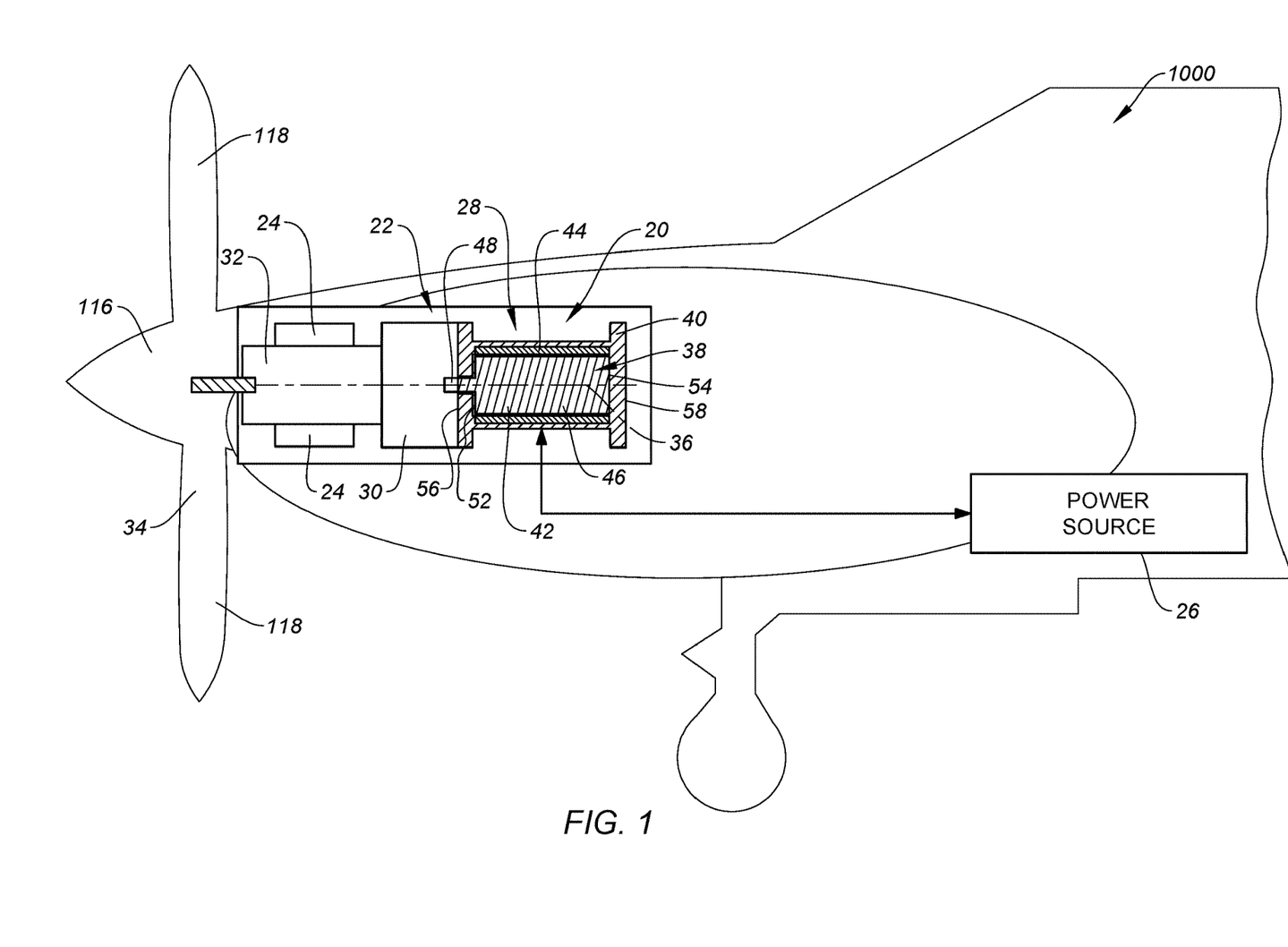
FIG. 1 schematically illustrates a side, cutaway view of a portion of an aircraft including an electric propulsion system, in accordance with one or more embodiments of the present disclosure.

FIG. 1 schematically illustrates a propulsion system 20 configured for an aircraft, such as the aircraft 1000 of FIG. 1. The aircraft 1000 may be a fixed-wing aircraft (e.g., an airplane), as shown in FIG. 1. Moreover, the aircraft may be a manned aerial vehicle or an unmanned aerial vehicle (UAV, e.g., a drone).

The propulsion system 20 of FIG. 1 includes a rotational assembly 22, one or more accessory load assemblies 24, and an electrical power source 26. The rotational assembly 22 includes an electric motor assembly 28, a mid-frame module 30, a transmission gearbox (TGB) module 32, and a propulsor 34 (e.g., a propeller) disposed along an axial centerline 36 (e.g., a rotational axis) of the propulsion system 20.

The electric motor assembly 28 includes an electric motor 38 and a motor housing 40. The electric motor 38 is electrically connected to the electrical power source 26. For example, the electric motor 38 is configured to receive electrical power from the electrical power source 26 for operation of the electric motor 38. The electric motor 38 may additionally be configured to direct electrical power to the electrical power source 26 (e.g., the electric motor 38 may be configured to operate as an electrical generator). The electric motor 38 may be configured as an alternating current (AC) electric motor or a direct current (DC) electric motor. For example, the electric motor 38 may be configured as a synchronous electric motor, an induction motor (e.g., an asynchronous electric motor), a permanent magnet electric motor, or the like, and the present disclosure is not limited to any particular electric motor configuration. The electric motor assembly 28 may further include other electrical control and/or conditioning equipment and components such as, but not limited to, an inverter, a motor controller, AC/DC conversion equipment, and/or the like.

The electric motor 38 of FIG. 1 includes a rotor 42 and a stator 44. The rotor 42 is configured for rotation about the axial centerline 36. The rotor 42 includes a rotor body 46. The rotor 42 may additionally include a shaft 48. The rotor body 46 is disposed in the motor housing 40. The rotor body 46 extends (e.g., axially extends) between and to a first axial end 52 of the rotor body 46 and a second axial end 54 of the rotor body 46. The shaft 48 is disposed at (e.g., on, adjacent, or proximate) the first axial end 52. The shaft 48 extends along the axial centerline 36 axially outward from the first axial end 52. For example, the shaft 48 may extend through the motor housing 40 to the mid-frame module 30. The stator 44 of FIG. 1 extends circumferentially about (e.g., completely around) the axial centerline 36 and the rotor body 46 in the motor housing 40.

The motor housing 40 is configured to support and house the electric motor 38. The motor housing 40 may extend circumferentially about (e.g., completely around) the axial centerline 36. The motor housing 40 extends (e.g., axially extends) between and to a first axial end 56 of the motor housing 40 and a second axial end 58 of the motor housing 40. The motor housing 40 may be attached to the mid-frame module 30, for example, at (e.g., on, adjacent, or proximate) the first axial end 56. The motor housing 40 may form or otherwise include a flange or other suitable mounting configuration for mounting the motor housing 40 to the mid-frame module 30. The motor housing 40 may additionally include one or more bearing assemblies for rotatably supporting the rotor 42 and its shaft 48.

Figure 2:
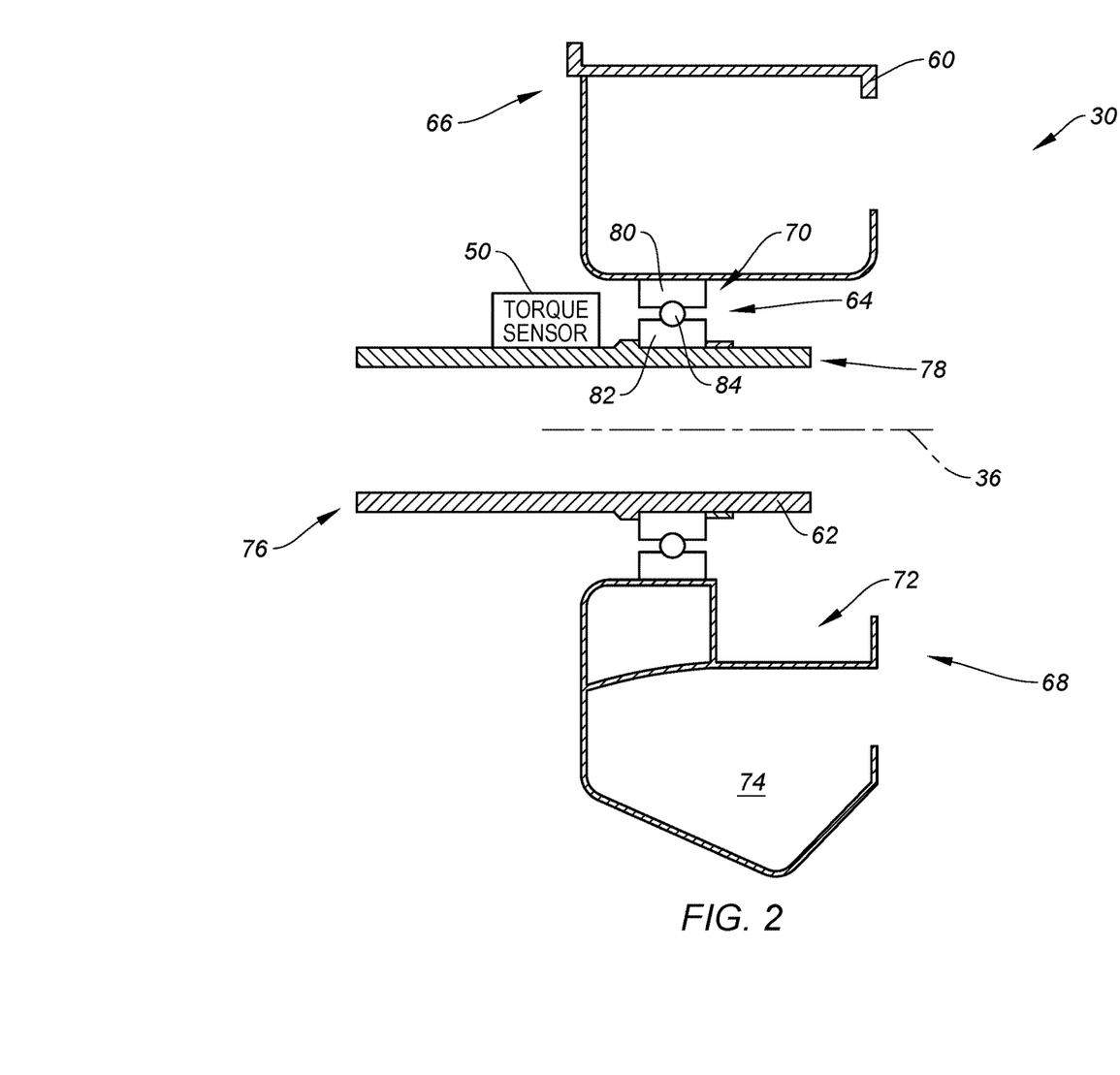
FIG. 2 illustrates a side, cutaway view of a portion of a rotational assembly for the electric propulsion system of FIG. 1, in accordance with one or more embodiments of the present disclosure.
Figure 3:
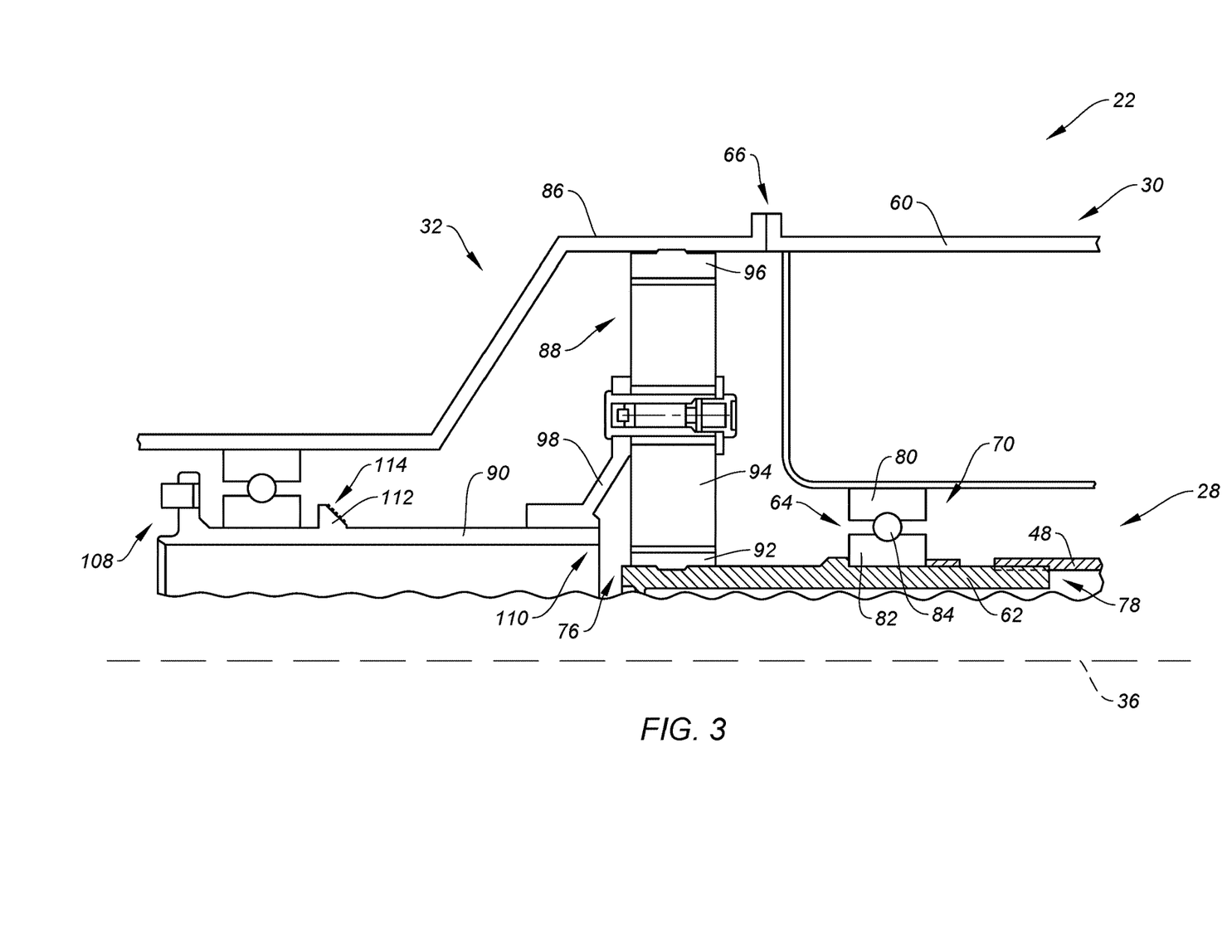
FIG. 3 illustrates a side, cutaway view of another portion of the rotational assembly for the electric propulsion system of FIG. 1, in accordance with one or more embodiments of the present disclosure.

FIG. 2 illustrates a cutaway view of the mid-frame module 30. The mid-frame module 30 includes a mid-frame case 60, a shaft 62, and a bearing assembly 64. FIG. 3 illustrates a cutaway view of portions of the rotational assembly 22 including the electric motor assembly 28, the mid-frame module 30, and the TGB module 32.

The mid-frame case 60 extends between and to a first axial end 66 of the mid-frame case 60 and a second axial end 68 of the mid-frame case 60. The mid-frame case 60 is mounted to the electric motor assembly 28 and the TGB module 32 to structurally support the electric motor assembly 28 and the TGB module 32 within the propulsion system 20 (see FIG. 1). The first axial end 66 may be mounted to or otherwise disposed at (e.g., on, adjacent, or proximate) the TGB module 32. The second axial end 68 may be mounted to or otherwise disposed at (e.g., on, adjacent, or proximate) the motor housing 40 (e.g., the first axial end 56) (see FIG. 1). The mid-frame case 60 may form or otherwise include a flange or other suitable mounting configuration for mounting the mid-frame case 60 to the motor housing 40 and to the TGB module 32. The mid-frame case 60 is configured to support the bearing assembly 64 and the shaft 62. The mid-frame case 60 may form a bearing compartment 70 within which bearing compartment 70 the bearing assembly 64 may be mounted to or otherwise supported by the mid-frame case 60. The mid-frame case 60 may additionally form an oil scavenge cavity 72 and/or an oil tank 74. The oil scavenge cavity 72 may be formed by the mid-frame case 60 adjacent and in fluid communication with the bearing compartment 70. For example, the oil scavenge cavity 72 of FIG. 2 is disposed adjacent the bearing compartment 70 at (e.g., on, adjacent, or proximate) the second axial end 68. The oil scavenge cavity 72 of FIG. 2 is disposed vertically below (e.g., with respect to a normal attitude of the propulsion system 20) the shaft 48, the shaft 62, the bearing assembly 64 to collect oil (e.g., lubricating and cooling oil) flowing from the shaft 48, the shaft 62, and/or the bearing assembly 64 (see FIG. 1).

The shaft 62 extends circumferentially about (e.g., completely around) the axial centerline 36. The shaft 62 extends between and to a first axial end 76 of the shaft 62 and a second axial end 78 of the shaft 62. The first axial end 76 is coupled to the TGB module 32, as will be discussed in further detail. The second axial end 78 is coupled to the rotor 42 such that rotation of the rotor 42 drives rotation of the shaft 62. For example, the second axial end 78 may be coupled to the shaft 48, for example, using a spline interface or another suitable mechanical coupling configuration. Alternatively, the shaft 48 and the shaft 62 may be formed by a single shaft. In some embodiments, the mid-frame module 30 may include a torque sensor 50 disposed at (e.g., on, adjacent, or proximate) the shaft 62. The torque sensor 50 may be formed, in part, by a portion of the shaft 62. For example, the torque sensor 50 may include a torque tube or other torque measurement configuration conventionally known in the art. The torque sensor 50 may be connected in communication (e.g., signal communication) with an electronic controller for the propulsion system 20 and/or the aircraft 1000 to provide an indication of a torque output of the electric motor 38 to the electronic controller, for example, for configurations of the electric motor 38 which may not include a torque measurement system (see FIG. 1).

The bearing assembly 64 of FIGS. 2 and 3 is mounted to the mid-frame case 60 and the shaft 62 and configured to rotatably support the shaft 62. The bearing assembly 64 of FIG. 2 is configured as a roller element bearing including an annular outer race 80, an annular inner race 82, and a plurality of bearing elements 84 (e.g., cylindrical or spherical elements). The outer race 80 circumscribes the inner race 82 and the bearing elements 84. The outer race 80 is mounted to the mid-frame case 60. The inner race 82 circumscribes and is mounted to the shaft 62. The bearing elements 84 are arranged in an annular array about the axial centerline 36, which array is radially between and engaged with (e.g., contacts) the outer race 80 and the inner race 82. The present disclosure, however, is not limited to the foregoing exemplary bearing assembly configuration. For example, in some other embodiments, the bearing assembly 64 may alternatively be configured as a journal bearing or any other type of bearing which may be used with rotational equipment.

The TGB module 32 includes a gearbox housing 86, a gear assembly 88, and an output shaft 90.

The gearbox housing 86 may be mounted to or otherwise disposed at (e.g., on, adjacent, or proximate) the mid-frame case 60 (e.g., the first axial end 66). The gearbox housing 86 may extend about (e.g., completely around) the axial centerline 36. The gearbox housing 86 may surround and provide support for the gear assembly 88 and the output shaft 90. The gearbox housing 86 may additionally provide support for the accessory load assemblies 24, as will be discussed in further detail. The gearbox housing 86 may additionally include or otherwise support one or more bearing assemblies for rotatably supporting the output shaft 90.

Figure 4:
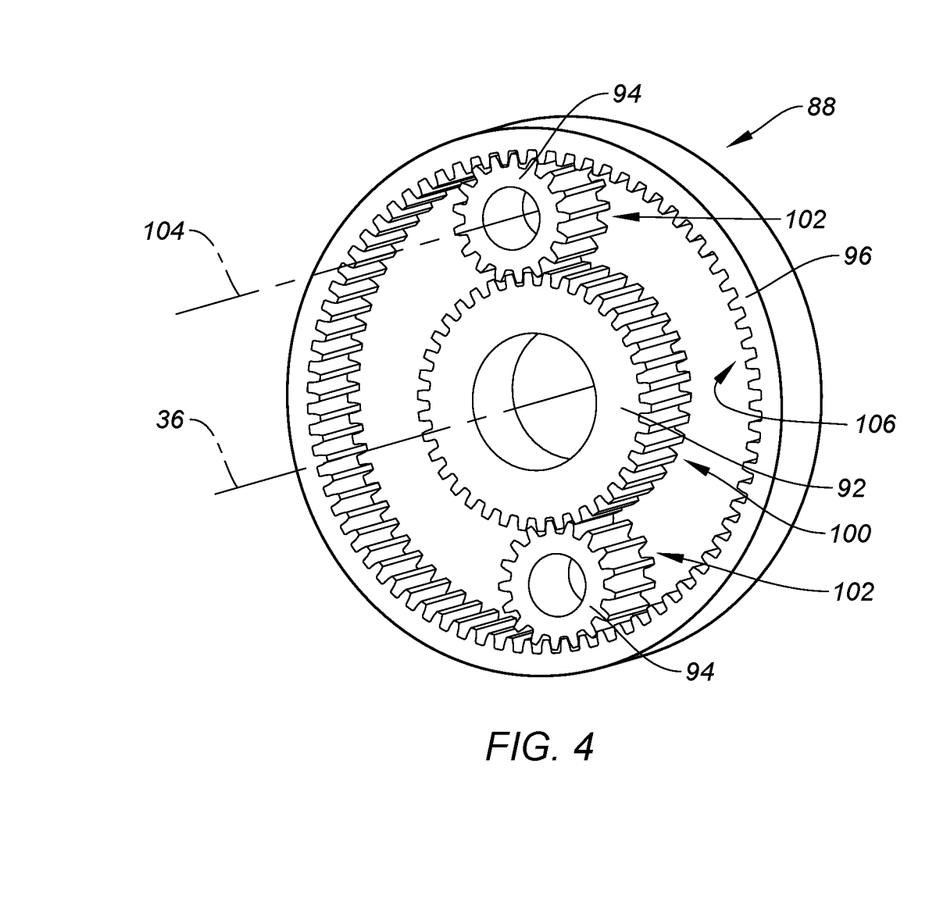
FIG. 4 illustrates a perspective view of a gear assembly for the electric propulsion system of FIG. 1, in accordance with one or more embodiments of the present disclosure.

FIG. 3 illustrates a cutaway view of a portion of the gear assembly 88 coupled to the shaft 62 and the output shaft 90. FIG. 4 illustrates a perspective view of the gear assembly 88. The gear assembly 88 of FIGS. 3 and 4 is configured as a planetary gear assembly (e.g., an epicyclic gear assembly) for driving the output shaft 90 at a reduced rotational speed relative to the shaft 62. The present disclosure, however, is not limited to the foregoing exemplary gear assembly 88 configuration. The gear assembly 88 of FIGS. 3 and 4 includes a sun gear 92, a plurality of planet gears 94, a ring gear 96, and a planet carrier 98.

The sun gear 92 is fixedly mounted to the shaft 62, for example, at (e.g., on, adjacent, or proximate) the first axial end 76. The sun gear 92 circumscribes the shaft 62. The sun gear 92 is configured for rotation about the axial centerline 36 with the shaft 62. The sun gear 92 includes gear teeth 100 engaged with (e.g., meshed with) each of the planet gears 94.

The planet gears 94 are disposed radially between the sun gear 92 and the ring gear 96. Each of the planet gears 94 includes gear teeth 102 engaged with (e.g., meshed with) the sun gear 92 (e.g., the gear teeth 100) and the ring gear 96. Each of the planet gears 94 is rotatable about a respective rotational axis 104, which respective rotational axis 104 itself revolves around the axial centerline 36 as the sun gear 92 rotates and drives rotation of the planet gears 94. The gear assembly 88 of FIG. 4 includes two planet gears 94, however, the present disclosure is not limited to any particular number of the planet gears 94 and the gear assembly 88 may alternatively include three or more planet gears 94.

The ring gear 96 is rotationally fixed relative to the axial centerline 36. The ring gear 96 is mounted to or otherwise disposed at (e.g., on, adjacent, or proximate) the gearbox housing 86. The ring gear 96 circumscribes the sun gear 92 and the planet gears 94. The ring gear 96 includes gear teeth 106 engaged with (e.g., meshed with) each of the planet gears 94 (e.g., the gear teeth 102).

The planet carrier 98 extends circumferentially about (e.g., completely around) the axial centerline 36. The planet carrier 98 is rotatably mounted to each of the planet gears 94 along each respective rotational axis 104. The planet carrier 98 is fixedly mounted to the output shaft 90. For example, the planet carrier 98 may drive rotation of the output shaft 90 about the axial centerline 36 in response to movement (e.g., revolution) of the planet gears 94 about the axial centerline 36.

The output shaft 90 extends circumferentially about (e.g., completely around) the axial centerline 36. The output shaft 90 extends between and to a first axial end 108 of the output shaft 90 and a second axial end 110 of the output shaft 90. The first axial end 108 is coupled to the propulsor 34 (see FIG. 1). The output shaft 90 is mounted to the planet carrier 98, for example, at (e.g., on, adjacent, or proximate) the second axial end 110. The output shaft 90 forms a bevel gear 112 on a radial exterior of the output shaft 90. The bevel gear 112 extends circumferentially about (e.g., completely around) the axial centerline 36. The bevel gear 112 may be disposed between (e.g., axially between) and spaced from the first axial end 108 and the second axial end 110. The bevel gear includes gear teeth 114.

Referring again to FIG. 1, the propulsor 34 is configured for rotation about a rotational axis. The rotational axis of the propulsor 34 may be the axial centerline 36 as shown in FIG. 1, or another rotational axis which is different than the axial centerline 36. The propulsor 34 of FIG. 1 is configured as a propeller. For example, the propulsor 34 of FIG. 1 includes a hub 116 and a plurality of propeller blades 118. The propeller blades 118 are mounted to the hub 116. The propeller blades 118 are circumferentially distributed about the hub 116, for example, relative to the axial centerline 36. The propeller blades 118 may be configured as variable-pitch propeller blades. For example, the propeller blades 118 may each be rotatable about a lengthwise axis to control (e.g., selectively vary) a pitch (e.g., an angle; sometimes referred to as a "beta angle") of the propeller blades 118. The present disclosure, however, is not limited to propeller configurations for the propulsor 34 and the propulsor 34 may alternatively be configured as a fan (e.g., for a turbofan propulsion system), an open rotor propulsor, or another configuration of aircraft propulsion rotor.

Figure 5:
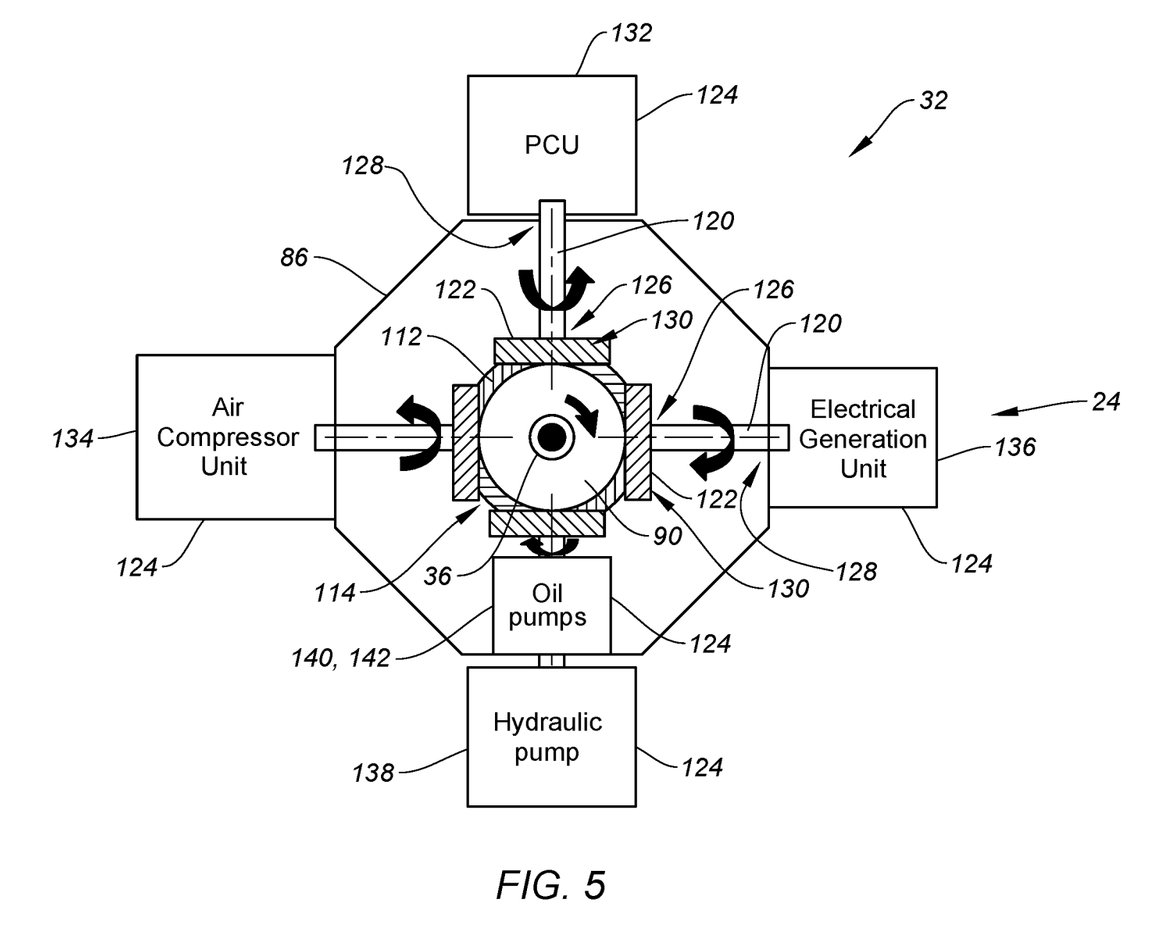
FIG. 5 schematically illustrates a cutaway view of another portion of the rotational assembly for the electric propulsion system of FIG. 1, in accordance with one or more embodiments of the present disclosure.

FIG. 5 schematically illustrates a cutaway view of the TGB module 32 and the accessory load assemblies 24. As shown in FIG. 5, the accessory load assemblies 24 may be circumferentially distributed about the TGB module 32 (e.g., relative to the axial centerline 36). Each of the accessory load assemblies 24 of FIG. 5 includes a tower shaft 120, a pinion gear 122, and at least one accessory load 124. The tower shaft 120 extends (e.g., radially extends) between an inner radial end 126 and an outer radial end 128. The pinion gear 122 is mounted to the tower shaft 120 at (e.g., on, adjacent, or proximate) the inner radial end 126. The pinion gear 122 includes gear teeth 130. The gear teeth 130 are engaged with (e.g., meshed with) the bevel gear 112 (e.g., the gear teeth 114).

The at least one accessory load 124 for each of the accessory load assemblies 24 facilitates one or more support functions of the aircraft 1000 or its propulsion system 20 (see FIG. 1). The at least one accessory load 124 may be mounted to or otherwise supported by the gearbox housing 86. For example, the at least one accessory load 124 may be mounted to an exterior or an interior of the gearbox housing 86. For each accessory load assembly 24, the at least one accessory load 124 is coupled to the tower shaft 120 such that rotation of the toward shaft 120 drives rotation of or otherwise effects operation of the at least one accessory load 124. For example, the at least one accessory load 124 may be coupled to the tower shaft 120 at (e.g., on, adjacent, or proximate) the outer radial end 128 or a radially intermediate position of the tower shaft 120 between the inner radial end 126 and the outer radial end 128.

FIG. 5 illustrates examples of the at least one accessory load 124 including, but not limited to, a propeller control unit (PCU) 132, an air compressor unit 134, an electrical generation unit 136 (e.g., a low-voltage generator), a hydraulic pump 138, an oil pump 140, and a scavenge pump 142. The present disclosure, however, is not limited to the aforementioned exemplary accessory loads 124 and the at least one accessory load 124 may include additional or alternative rotational loads or other loads. For configurations of the propulsion system 20 in which the propulsor 34 includes variable-pitch propeller blades 118, the PCU 132 may control (e.g., modulate) the pitch of the propeller blades 118 (see FIG. 1). For example, the PCU 132 may control the pitch of the propeller blades 118 to achieve a desired thrust of the propulsion system 20 while the propulsor 34 rotation speed remains constant or substantially constant (e.g., a constant-speed propeller assembly). The air compressor unit 134 may supply high-pressure air for the aircraft 1000 and/or its propulsion system 20. For example, the high-pressure air may be supplied to an environmental control system (ECS) of the aircraft 1000, for pneumatic systems of the aircraft 1000 and/or the propulsion system 20, for air cooling systems, etc. The electrical generation unit 136 may be used to generate and supply electrical power (e.g., low-voltage electrical power), for example, to one or more electronic control systems of the aircraft 1000 and/or the propulsion system 20. The hydraulic pump 138 may be used, for example, to supply a pressurized hydraulic fluid to the aircraft 1000 and/or the propulsion system 20 to effect operation of one or more hydraulic-actuated systems such as aircraft control surfaces, aircraft landing gear assemblies, thrust reverser assemblies, and the like. As will be discussed in further detail, one of the accessory load assemblies 24 may include the oil pump 140 and the scavenge pump 142 to supply oil to components of the propulsion system 20 such as, but not limited to, the electric motor 38, bearing assemblies (e.g., the bearing assembly 64), the gear assembly 88, and/or the PCU 132.

Referring again to FIG. 1, the electric power source 26 is electrically connected to the electric motor 38 to supply electric power to the electric motor 38 for driving the TGB module 32 (e.g., the gear assembly 88). The electric power source 26 may include an electric generating source such as, but not limited to, an auxiliary power unit (APU) or a fuel cell generator (e.g., a hydrogen fuel cell generator). The electric power source 26 may additionally or alternatively include an electric power storage device such as, but not limited to, one or more batteries and/or one or more capacitors. The present disclosure is not limited to any particular configuration of the electric power source 26 provided the electric power source 26 can supply electric power to the electric motor 38 for operation of the electric motor. The electric power source 26 may be disposed in the propulsion system 20 or the aircraft 1000 on which the propulsion system 20 is mounted.

In operation, the electric motor 38 drives rotation of the rotor 42 about the axial centerline 36. The rotor 42, coupled with the gear assembly 88 (e.g., the sun gear 92) by the shaft 62, drives the gear assembly 88 and, thereby, the propulsor 34 and the accessory load assemblies 24, for example, by rotation of the output shaft 90.

Figure 6:
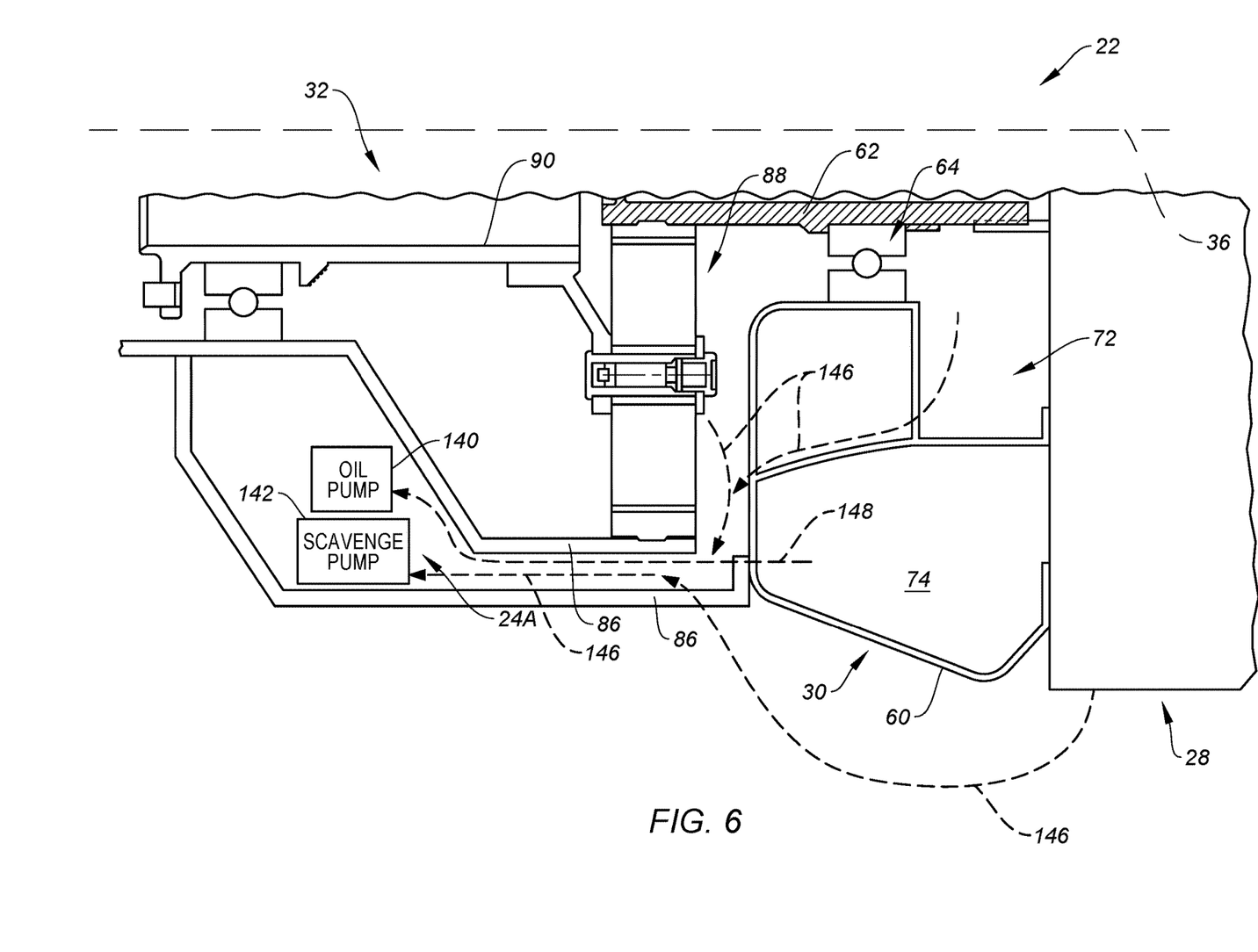
FIG. 6 illustrates a side, cutaway view of another portion of the rotational assembly for the electric propulsion system of FIG. 1, in accordance with one or more embodiments of the present disclosure.

Referring to FIGS. 5 and 6, in some embodiments, a first accessory load assembly 24A of the accessory load assemblies 24 may include the oil pump 140 and/or the scavenge pump 142. The first accessory load assembly 24A may be disposed vertically below (e.g., with respect to a normal attitude of the propulsion system 20; see FIG. 1) the output shaft 90. The oil pump 140 and/or the scavenge pump 142 may be disposed within the gearbox housing 86, for example, at (e.g., on, adjacent, or proximate) a vertical bottom of the TGB module 32 (e.g., the gearbox housing 86). This position of the oil pump 140 and/or the scavenge pump 142 facilitates a more compact (e.g., axially compact)

arrangement of the accessory load assemblies 24 and their respective accessory loads 124. Moreover, the position of the scavenge pump 142 at the vertical bottom of the gearbox housing 86 facilitates scavenge pump 142 collection of oil which drains from or is otherwise received from, for example, the electric motor 38 (see FIG. 1), the shaft 62, the bearing assembly 64, the gear assembly 88, and/or the output shaft 90. FIG. 6 schematically illustrates an exemplary scavenge flow path 146 of oil to the scavenge pump 142. For example, oil from the electric motor 38, the shaft 62, and/or the bearing assembly 64 may drain through the oil scavenge cavity 72 to a location of the scavenge pump 142 at the vertical bottom of the gearbox housing 86. The scavenge pump 142 may direct (e.g., pump) the oil to the oil tank 74 and/or to one or more components of the rotational assembly 22. The oil pump 140 is connected in fluid communication with the oil tank 74, for example, using any suitable pipe, hose, tube, or other fluid conduit. FIG. 6 schematically illustrates an exemplary oil flow path 148 of oil to the oil pump 140 from the oil tank 74. The oil pump 140 is configured to direct (e.g., pump) oil from the oil tank 74 and supply the oil to one or more components such as, but not limited to, the electric motor 38, the shaft 62, the bearing assembly 64, the gear assembly 88, and/or the PCU 132.

The present disclosure electric motor assembly 28, mid-frame module 30, and TGB module 32 may facilitate conversion of a gas turbine engine propulsion system to an electric propulsion system (e.g., a propulsion system using only electrical power for propulsion). The configuration of the accessory load assemblies 24 incorporated with or otherwise axially aligned with the TGB module 32 may accommodate limited axial space of the propulsion system 20 which may be available for components of the electric motor assembly 28, mid-frame module 30, and TGB module 32, as will be discussed in further detail. The configuration of the TGB module 32 and the accessory load assemblies 24 may additionally facilitate improved reliability of components of the propulsion system 20. For example, in the event of a failure of the electrical power source 26, the electric motor assembly 28, or another component which prevents or otherwise inhibits operation of the electric motor 38, the propulsor 34 may be operated in a feathering mode, such that rotation of the propulsor 34 (e.g., driven by ambient air flow) drives the output shaft 90 and the accessory load assemblies 24. Accordingly, accessory loads 124 such as the PCU 132, the oil pump 140, and the electrical generation unit 136 may still be available for operation to supply propulsion system 20 and/or aircraft 1000 loads.

Figure 7:
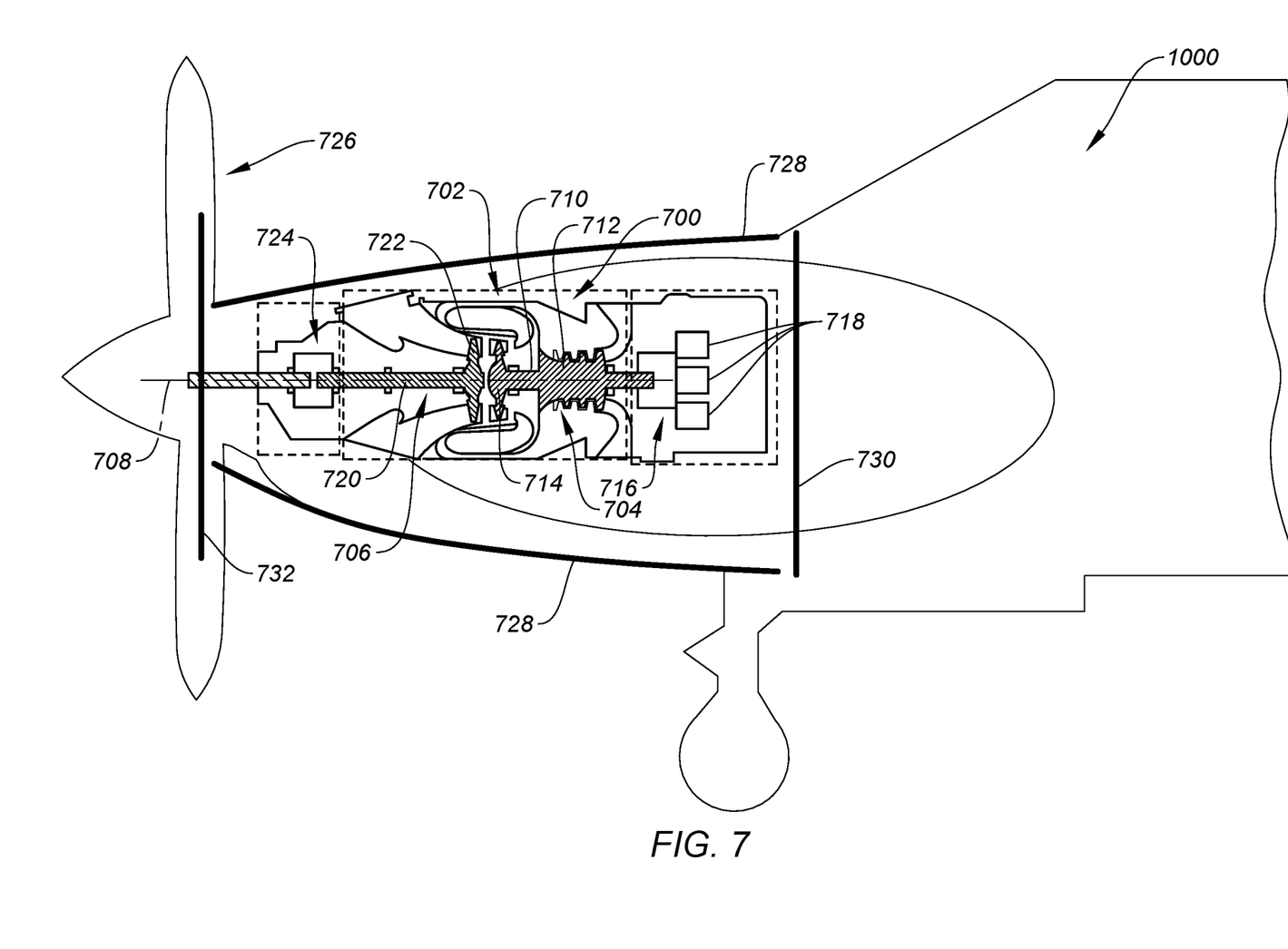
FIG. 7 illustrates a side, cutaway view of a portion of an aircraft including a gas turbine engine propulsion system, in accordance with one or more embodiments of the present disclosure.

FIG. 7 illustrates an exemplary propulsion system 700 for an aircraft, such as the aircraft 1000, which exemplary propulsion system 700 may be modified in accordance with aspects of the present disclosure. The propulsion system 700 of FIG. 7 includes a gas turbine engine 702. The gas turbine engine 702 of FIG. 7 includes a first rotational assembly 704 and a second rotational assembly 706 arranged sequentially along an axial centerline 708 of the gas turbine engine 702. The first rotational assembly 704 (e.g., a high-pressure spool) includes a first shaft 710, a bladed compressor rotor 712, and a bladed first turbine rotor 714. The first shaft 710 interconnects the bladed compressor rotor 712 and the bladed first turbine rotor 714. The first shaft 710 is coupled to an accessory gearbox (AGB) assembly 716. Rotation of the bladed first turbine rotor 714 about the axial centerline 708 drives the AGB assembly 716 which, in turn, drives at least one accessory load 718 such as, but not limited to, the aforementioned accessory loads 124 (see FIGS. 5 and 6). The second rotational assembly 706 (e.g., a low-pressure spool or a power spool) includes a second shaft 720 and a bladed second turbine rotor 722. The second shaft 720 is connected to the bladed second turbine rotor 722. The second shaft 720 is coupled to a reduction gearbox (RGB) assembly 724. Rotation of the bladed second turbine rotor 722 about the axial centerline 008 drives the RGB assembly 724 which, in turn, drives rotation of a propulsor 726 to generate thrust for the propulsion system 700.

Still referring to FIG. 7, the propulsion system 700 may have a number of shape and/or size constraints which may further complicate conversion to an electric propulsion system configuration (e.g., the propulsion system 20). For example, a housing 728 (e.g., nacelle) of the propulsion system 700 may have an aerodynamic shape to facilitate optimal propulsor 726 thrust efficiency, pilot visibility, and aerodynamic drag. Accordingly, modification of a size and/or shape of the housing 728 to accommodate an electric propulsion system configuration may be undesirable. Moreover, modification or replacement of the housing 728 to accommodate an electric propulsion system configuration may be expensive and time consuming. The aircraft 1000 may include a cabin firewall 730 between the propulsion system 700 and occupied areas of the aircraft 1000, which cabin firewall 730 may limit an axial extent of an electric propulsion system configuration. The location of the propulsor 726 (e.g., a propeller plane axial position 732) may further limit the axial extent of an electric propulsion system configuration. In accordance with the present disclosure, the electric motor assembly 28, the mid-frame module 30, and the TGB module 32 may be used to replace the gas turbine engine 702 for propulsion and accessory loads of the propulsion system 20, 700 while fitting within the narrow allowable space which may be available for at least some propulsion system configurations.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for a propulsion system of an aircraft, the assembly comprising:
   a gearbox module including a gear assembly and an output shaft, the gear assembly is connected to the output shaft;
   at least one accessory load assembly, the at least one accessory load assembly includes at least one accessory load coupled to the output shaft;
   a propulsor coupled to the output shaft; and
   an electric motor including a rotor, the rotor is coupled to the gear assembly to drive rotation of the output shaft about a rotational axis, the rotation of the output shaft driving rotation of the propulsor and the at least one accessory load for each accessory load assembly of the at least one accessory load assembly,
   wherein the output shaft extends between and to a first axial end and a second axial end, the output shaft is connected to the propulsor at the first axial end, and the output shaft is connected to the gear assembly at the second axial end; and
   wherein the at least one accessory load assembly includes a plurality of accessory load assemblies circumferentially distributed about the gearbox module.

2. The assembly of claim 1, wherein the gear assembly is a planetary gear assembly.

3. The assembly of claim 2, wherein the planetary gear assembly includes a sun gear, a plurality of planet gears, and a planet carrier, the sun gear is coupled to the rotor, each planet gear of the plurality of planet gears is engaged with the sun gear and configured to revolve around the sun gear as the sun gear rotates, the planet carrier is rotatably connected to each planet gear of the plurality of planet gears, and the planet carrier is connected to the output shaft and configured to drive rotation of the output shaft as the plurality of planet gears revolve around the sun gear.

4. The assembly of claim 1, wherein the output shaft includes a bevel gear, and the bevel gear is coupled to the at least one accessory load for each accessory load assembly of the at least one accessory load assembly.

5. The assembly of claim 4, wherein each accessory load assembly further includes a shaft, and the shaft is engaged with the bevel gear and the at least one accessory load.

6. The assembly of claim 1, wherein the at least one accessory load assembly is positioned radially outside the output shaft.

7. The assembly of claim 1, wherein the at least one accessory load assembly includes an oil scavenge pump disposed at a vertical bottom of the gearbox module.

8. The assembly of claim 7, wherein the gearbox module includes a gearbox housing surrounding the gear assembly and the output shaft, and the oil scavenge pump is disposed within the gearbox housing.

9. An assembly for a propulsion system of an aircraft, the assembly comprising:
   a gearbox module including a planetary gear assembly and an output shaft, the planetary gear assembly includes a sun gear, a plurality of planet gears, and a planet carrier, each planet gear of the plurality of planet gears is engaged with the sun gear and configured to revolve around the sun gear as the sun gear rotates, the planet carrier is rotatably connected to each planet gear of the plurality of planet gears, and the planet carrier is connected to the output shaft and configured to drive rotation of the output shaft as the plurality of planet gears revolve around the sun gear;
   at least one accessory load assembly, the at least one accessory load assembly includes at least one accessory load coupled to the output shaft;
   a propulsor coupled to the output shaft;
   an electric motor including a rotor including a first shaft coupled to the sun gear, and
   a mid-frame module, the mid-frame module including a mid-frame case.

10. The assembly of claim 9, wherein the gearbox module includes a gearbox housing surrounding the gear assembly and the output shaft, and the at least one accessory load assembly includes an oil scavenge pump disposed at a vertical bottom of the gearbox housing.

11. The assembly of claim 10, wherein the planetary gear assembly further includes a ring gear fixedly mounted to the gearbox housing, and each planet gear of the plurality of planet gears is engaged with the ring gear.

12. The assembly of claim 9, the mid-frame module including a second shaft and a bearing assembly, the second shaft extending between and to a first axial end and a second axial end, wherein the second shaft is connected to the sun gear at the first axial end, the second shaft is connected to the first shaft at the second axial end, and the bearing assembly rotatably supports the second shaft.

13. The assembly of claim 12, wherein the mid-frame case surrounds the second shaft and the bearing assembly, the mid-frame case forms an oil scavenge cavity, and the mid-frame case is configured to direct oil from the mid-frame module to the gearbox module through the scavenge cavity.

14. An assembly for a propulsion system of an aircraft, the assembly comprising:
- a gearbox module including a gear assembly and an output shaft, the gear assembly is connected to the output shaft;
- at least one accessory load assembly, the at least one accessory load assembly includes at least one accessory load coupled to the output shaft;
- a propulsor coupled to the output shaft;
- an electric motor assembly including an electric motor, the electric motor includes a rotor; and
- a mid-frame module mounted to the gearbox module and the electric motor assembly, the mid-frame module includes a shaft and a bearing assembly, the shaft couples the rotor to the gear assembly, and the bearing assembly rotatably supports the shaft.

15. The assembly of claim 14, wherein the mid-frame module is disposed axially between the gearbox module and the electric motor assembly.

16. The assembly of claim 14, wherein the mid-frame module further includes a mid-frame case surrounding the shaft and the bearing assembly, the mid-frame case forms an oil scavenge cavity, and the mid-frame case is configured to direct oil from the mid-frame module to the gearbox module through the scavenge cavity.

17. The assembly of claim 14, wherein the mid-frame module further includes a mid-frame case surrounding the shaft and the bearing assembly, and the mid-frame case forms an oil tank vertically below the shaft.

* * * * *